United States Patent [19]

Watson

[11] 4,133,036
[45] Jan. 2, 1979

[54] METHOD AND SYSTEM FOR MONITORING A PHYSICAL CONDITION OF A MEDIUM

[75] Inventor: Robert G. Watson, South Euclid, Ohio

[73] Assignee: Republic Steel Corporation, Cleveland, Ohio

[21] Appl. No.: 661,618

[22] Filed: Feb. 26, 1976

[51] Int. Cl.² .................. G01K 1/12; G01K 17/00; G08B 21/00
[52] U.S. Cl. .................................. 364/477; 73/344; 73/359; 136/234; 164/4; 340/347 AD; 364/551; 364/557
[58] Field of Search ........... 235/151.3, 151.11, 151.13, 235/151.12; 340/227 R, 227.1, 213 R, 213 Q, 214, 228 R, 347 AD; 164/4; 136/231, 234; 116/101; 364/468, 477, 551, 557, 575, 811, 554, 555; 73/1 F, 339 R, 362, 190; 177/1, 25, DIG. 3

[56] References Cited

U.S. PATENT DOCUMENTS

| | | | |
|---|---|---|---|
| 3,202,804 | 8/1965 | Schlein | 235/151.3 |
| 3,392,914 | 7/1968 | Nienstaedt | 235/151.12 |
| 3,459,925 | 8/1969 | Goosey et al. | 235/151.3 |
| 3,475,599 | 10/1969 | Schwartzenberg et al. | 235/151.3 |
| 3,561,743 | 2/1971 | Schroeder et al. | 235/151.12 |
| 3,594,750 | 7/1971 | Mueller | 340/227 R |
| 3,602,701 | 8/1971 | Boyd, Jr. | 235/151.12 |
| 3,657,926 | 4/1972 | Munson et al. | 235/151.3 |
| 3,688,295 | 8/1972 | Tsoras et al. | 340/227 R |
| 3,879,724 | 4/1975 | McDonald | 340/347 AD |
| 3,880,007 | 4/1975 | Emschermann et al. | 73/362 R |
| 3,951,221 | 4/1976 | Rock | 177/1 |

OTHER PUBLICATIONS

Holtby, Fulton; Rapid Temperature Measurements of Molten Iron and Steel with Immersion Thermocouple; Trans. of Am. Soc. for Metals, vol. 29, Dec. 1941, pp. 863-880.
New Device Measures Temperature of Molten Steel; Steel, Feb. 26, 1945, p. 100.

Primary Examiner—Malcolm A. Morrison
Assistant Examiner—Errol A. Krass
Attorney, Agent, or Firm—Watts, Hoffmann, Fisher & Heinke Co.

[57] ABSTRACT

A method and system for approximately indicating the temperature of molten steel is described. A temperature sensor is immersed in the molten steel and produces an output signal which indicates the temperature sensed by the sensor. The temperature output signal is sampled and a number of sample temperature values are produced. These values are stored by the system for evaluation. A plurality of stored sample values are intercompared, and if they fall within a given range, or band, of values, the existence of a temperature dwell is indicated. The system then calculates an approximate dwell temperature using the intercompared values.

An alternative disclosed system additionally includes an oxygen sensor, related components and a switching network permitting the system to successively operate to approximate oxygen and temperature levels in molten steel.

21 Claims, 5 Drawing Figures

METHOD AND SYSTEM FOR MONITORING A PHYSICAL CONDITION OF A MEDIUM

BACKGROUND OF THE INVENTION

1. Field of the Invention

The present invention relates to a method and system for evaluating the condition of a medium and, more particularly, relates to a method and system for approximating the values of unstable physical conditions of a medium.

2. Prior Art

Determination of physical conditions of a medium frequently requires exposure of a condition sensor to the medium in such a way that the sensor indicates a changing condition level until a sensed condition "dwell" occurs where the sensor indication tends to remain constant. The dwelling sensor indication value represents the condition of the medium. Conditions of the character referred to are, for example, pressure, temperature, conductivity, or some other condition which bears a known relationship to the measured condition.

Sensors which produce a continuously variable, or analog, sensed condition signal have been commonly used for sensing temperature and pressure levels. The analog condition signals have often controlled operation of pen recorders or similar signal display and recording devices so that the instantaneous level of the sensed condition at any particular time is graphically displayed and determinable. By viewing the graphic representation of the condition as sensed, an individual having experience with the medium and the condition being sensed can form fairly reliable judgments concerning actual condition levels of the medium.

By way of example, when the temperature of a constant temperature liquid bath is to be determined, a thermocouple or other suitable sensor device is immersed in the bath and heat transfer to or from the bath changes the thermocouple temperature until the thermocouple and bath are in equilibrium. The analog electrical output signal from the thermocouple will vary substantially from moment to moment until the thermocouple temperature approaches the bath temperature, at which time the rate of change of the signal is reduced. When the thermocouple is in equilibrium with the bath, the signal ceases changing and a temperature dwell is encountered.

Instruments for automatically determining temperature in such circumstances have been proposed. These instruments have generally employed electronic circuitry for determining the instantaneous rate at which the sensed temperature signal changes. When the rate of the signal change is zero or close to zero (indicating a dwell), the circuitry may operate to produce a quantitized output signal indicating the dwell temperature level.

In some circumstances, the existence of a condition dwell and the level of the dwell are difficult to determine because the medium condition is unstable. Unstable temperature conditions tend to be encountered in high temperature liquid or gases which frequently contain zones of differing temperatures. The temperature of molten steel in a basic oxygen furnace, for example, cannot be precisely determined primarily because the steel contains circulating convection currents and thus temperatures vary with time and location in the furnace.

A typical analog sensed temperature trace for such steel is characterized by a series of peaks and valleys which may not clearly indicate a sensed temperature dwell or a particular dwell level. Prior art circuitry for recognizing dwells and producing output dwell temperature readings are not suitable for use because the instantaneous rate of change of the sensed temperature with respect to time does not necessarily indicate a dwell when it reaches zero. Accordingly, automatic condition determination using the prior art teachings has not been universally possible.

Steel-making is one field where automatic condition determination has not been used. In basic oxygen furnace operation, for example, skilled attendants have traditionally monitored time-temperature traces produced by pen recorders for the purpose of judging when the trace has "dwelled" and for approximating the steel temperature. This process has been, at least to some extent, subjective and therefore not necessarily consistent from time to time and attendant to attendant.

The same has been true for oxygen content measurements of molten steel. Oxygen content of steel is commonly measured by a cell capable of producing an electrical signal which varies as a function of sensed partial pressure of oxygen. Oxygen partial pressure tends to vary and is thus unstable in molten steel. Furthermore the amount of dissolved oxygen in the steel depends on the steel temperature. When either, or both, the oxygen and temperature conditions are not properly, or accurately, evaluated, serious problems are encountered later on in the steel-making process.

For the reasons indicated, prior art proposals for evaluating unstable sensed conditions have not been completely satisfactory, particularly in iron and steel production.

SUMMARY OF THE INVENTION

The present invention produces a new and improved method and system for enabling automatic determination of approximate condition levels of an unstable environment in a reliable and accurate manner. In accordance with principles of the invention, the existence of a sensed condition dwell is identified by repetitively sampling an analog condition sensor output signal, storing sample signal values and evaluating stored signal values to identify the occurrence of a sensed condition dwell and to produce a quantified approximation of the condition dwell level from the stored sample signal values.

One important feature of the invention resides in the manner the input data is processed. After the sample values are stored at least one of a plurality of the stored values is compared to each of the remaining values of the plurality. If the compared values fall within a predetermined range of values a condition dwell is indicated by the system. If not, the system obtains at least an additional sample value and the evaluation process is repeated utilizing updated data.

Another feature of the invention resides in the production of an approximation of the detected condition dwell level. The sample values which are compared to determine that a dwell exists are used in calculating the approximate dwell level. In one preferred embodiment, an arithmetic average of the sample values is calculated and output from the system.

In one preferred form the invention is used to determine approximately sensed condition values of molten steel in a steel-making process. One system constructed according to the principles of the invention receives analog signals from a steel temperature sensor, evaluates data based on the signals to determine when a sensed temperature dwell is encountered, and determines the approximate level of the temperature dwell (thus approximating the temperature of the steel).

The system includes an input data processing section which receives the analog input signals and produces sample temperature values. The sample temperature values are transmitted to an evaluation section where they are stored for evaluation. Evaluation is accomplished by intercomparing a plurality of stored sample temperature values and determining that the intercompared values fall within a predetermined range, or band, of values regardless of their magnitude. When the intercompared values fall within the predetermined range, the system produces a dwell-indicating signal. The system also includes an output data processing section which computes an approximate dwell temperature level.

In another preferred form, a system employing the principles of the invention is employed to serially determine the temperature and oxygen content of molten steel. The dissolved oxygen content of molten steel varies according to the steel temperature so that oxygen content readings must be corrected to reflect the steel temperature at which the reading is obtained. In accordance with the invention, the system is supplied with both a temperature-responsive input signal and an oxygen content responsive input signal. The approximate steel temperature level is calculated and output from the system to a display, computer, or storage facility. The system then operates in an oxygen dwell-determining mode in which analog sensed oxygen content signals are input to the system. The system determines when an oxygen dwell is encountered and computes an approximate dwell level, uncorrected for the steel temperature. The oxygen level approximation is then output by the system enabling the oxygen content to be corrected for the steel temperature.

An important feature of this form of the invention resides in a switching network by which the system is operated between multiple condition dwell determing modes so that the system can be employed to serially determine sensed dwells and/or values of different physical conditions.

Other features and advantages of the invention will become apparent from the following description of preferred embodiments made in reference to the accompanying drawings.

DESCRIPTION OF THE PREFERRED EMBODIMENTS

Figure 1:
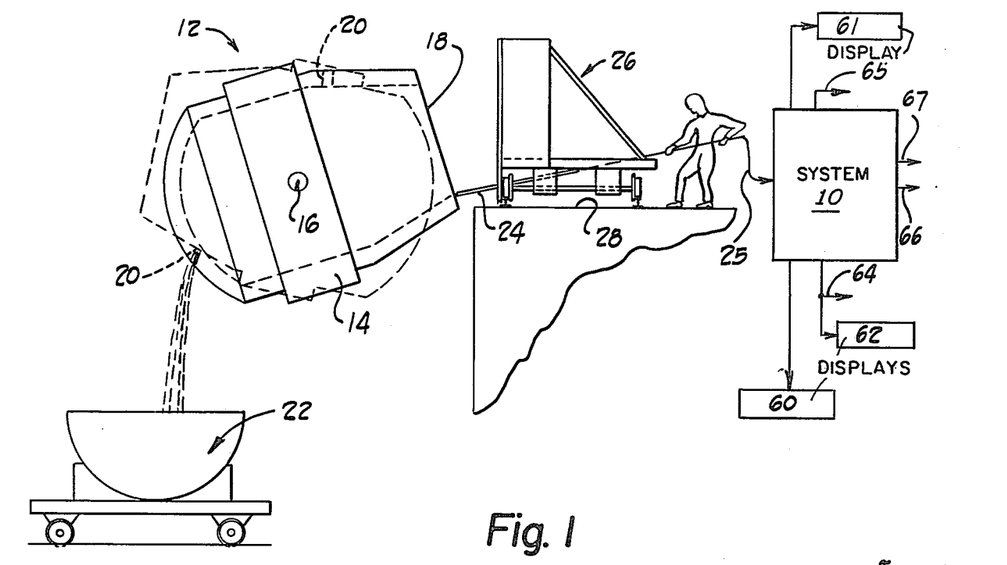
FIG. 1 is a schematic view of part of a steel-making plant associated with a condition-determining system embodying the present invention.

A condition-determining system 10 embodying the present invention is illustrated by FIG. 1 of the drawings associated with a basic oxygen furnace 12. Systems embodying the invention can be utilized in determining condition dwells and dwell levels in many environments but are particularly advantageous in environments where conditions are unstable. Steel-making is one type of environment where use of the invention is particularly suited and therefore the invention is illustrated and is described in reference to steel-making.

The basic oxygen furnace 12 is schematically illustrated as including a vessel 14 supported on trunions for pivotal movement about an axis 16. The vessel 14 is formed by a structurally strong outer shell which is lined with refractory material. The vessel 14 is charged with molten iron, scrap, and other steel ingredients which are dropped into the vessel through an end opening 18 by suitable charging equipment (not illustrated). The vessel 14 is tilted from, say, 30° to 45° from vertical during charging. The vessel 14 is then pivoted to its upright position, i.e., with its open end 18 facing vertically upwards, and an oxygen lance (not illustrated) is lowered into the vessel through the end 18. Oxygen is forced into the molten metal through the lance.

The oxygen combines with carbon and other impurities in the metal liberating substantial heat in the process. The carbon content of the metal is reduced by the reaction with oxygen which causes the generation of gas and various other materials are removed from the molten metal so that, after the oxygen has been blown into the vessel, a body of molten refined steel remains in the vessel (at a temperature greater than before the oxygen blow) with a layer of molten slag floating on and covering the steel surface. The contents of the vessel 14 is called a heat of steel or a "heat."

When blowing has been completed and the chemistry, oxygen content and temperature of the heat of steel are such that the heat can be poured, the vessel is pivoted to the position illustrated by broken lines in FIG. 1 so that the refined steel is poured from the vessel via a tap hole 20 and into a ladle on a ladle-supporting car, which is indicated by the reference character 22. The steel in the ladle is subsequently poured, or teemed, into ingot molds (not shown) where the steel solidifies to form ingots.

If the temperature of the steel poured from the furnace 12 is not at an acceptable level, the quality of the ingots and steel products produced from them can suffer appreciably. For example, if the steel temperature is too high when poured from the furnace, liquid steel can escape from the ingot molds onto the ground, or the shop floor. The steel can stick or weld to the ingot molds when it freezes making it difficult to remove the ingots. Oxide inclusions tend to be formed in ingots because of excessive pouring temperatures.

If the steel temperature is too low when poured, the ingots can contain surface irregularities such as "scabs." The low-temperature steel can also freeze in the ladle tap hole while the ingot molds are being filled which delays the process while the plugged tap hole is cleared. Likewise steel can freeze and coat the inside of the ladle further interfering with pouring from the ladle.

If the free oxygen level (the heat tends to be saturated with oxygen from the blow) is too high when pouring takes place, the free oxygen combines with carbon after the pour, thus changing the steel's chemistry. Furthermore, the presence of free oxygen in molten steel produces a boiling effect in the ingot molds which causes blow holes and porosity in the ingots.

Defects in ingots of the character referred to become defects in semifinished rolled products (billets, blooms and bars) made from the ingots, and the defects must be removed, often at considerable expense. Interruptions, delays and improper steel chemistry in the steel production process are likewise wasteful and costly. Accordingly, the temperature and oxygen levels in the furnace are monitored and controlled so that the conditions of heats which are poured are optimized.

The temperature and free oxygen content of the heat are monitored by the use of a sensing lance 24 (see FIG. 2) which may be manually thrust into the vessel 14 and partially immersed in the molten steel. The sensing lance 24 is electrically connected to the system 10 by a signal cable 25 so that sensed condition signals produced by the lance are fed to, and automatically analyzed by, the system 10.

Referring again to FIG. 1, when temperature and oxygen levels are to be monitored, a wheeled heat-shielded car 26 is positioned on the charging floor 28 adjacent the vessel 14. The vessel 14 is tilted to its solid line position (FIG. 1) so that the open end 18 faces the heat-shielded car 26. At this juncture a furnace attendant behind the car thrusts the tip of the lance 24 into the heat through the open end of the vessel 14. The car 26 is provided with suitable viewing and access ports to facilitate manipulation of the lance while protecting the attendant.

Figures 2, 3:
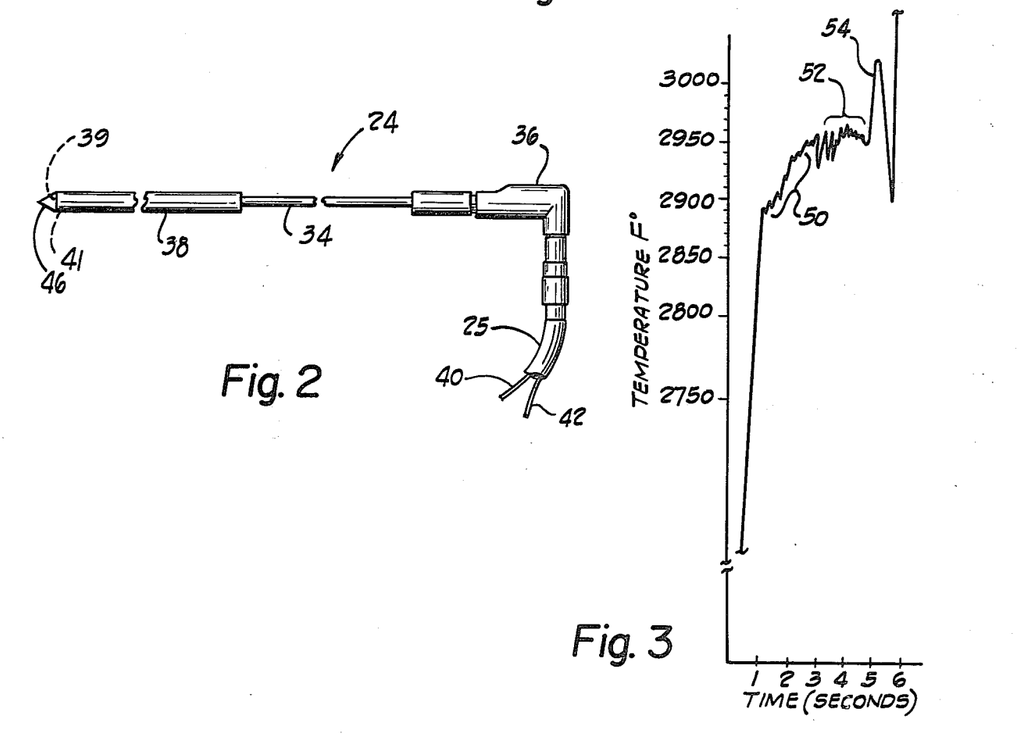
FIG. 2 is an elevational view of a condition-sensing lance assembly.
FIG. 3 is a graphic representation of a time-temperature trace produced by a thermocouple junction immerged in molten steel.

The illustrated lance 24 comprises a tubular support body 34, an elbow 36 at one end of the body from which the cable 25 extends, and a disposable sensor assembly 38 detachably secured to the opposite end of the body. The sensor assembly 38 is formed by a refractory support tube detachably connected to the support body 34, a thermocouple junction 39 and associated leads 40 (see FIG. 4), and an oxygen-sensing cell 41 and its leads 42 (see FIG. 5). The leads 40, 42 extend through the assembly 38 and make electrical contact with conductors of the cable 25 so that the assembly 38 can be quickly attached and detached from the support body.

The thermocouple junction 39 and cell 41 are disposed at the projecting end of the support tube and covered by a consumable metal tip 46 which protects them from damage as the lance tip passes through the slag layer. The tip 46 melts when immersed in the heat so that the junction 39 and the cell 41 contact the molten steel. Lances of the character referred to are commercially available, well-known devices, and further description of the lance 24 is therefore omitted. One such lance is available from Leeds and Northrup under the trademark TEMP-O-TIP.

According to conventional practice, after oxygen and/or temperature levels have been monitored the tip of the lance is withdrawn from the steel, and the assembly 38 is dislodged from the supporting body 34 after which it falls into the vessel and is consumed. A replacement sensor assembly is then secured to the body 34 for future use.

It should be apparent that the oxygen cell and thermocouple junction both respond rather markedly to being thrust into a molten body of metal after having been exposed to an oxygen-rich, relatively low-temperature, shop atmosphere. A typical reaction of the junction 39 is illustrated graphically by FIG. 3 in which the output signal from the junction 39 is plotted in terms of time and temperature. When immersed in the heat of steel, the rise of the temperature-responsive output signal from the lance 24 is nearly asymptotic as the junction 39 is heated by the steel. This is due to the small mass and low specific heat of the thermocouple junction compared with the great mass and temperature of the surrounding steel.

When the junction temperature approaches the temperature of the steel, the rate of heat transfer to the junction 39 is reduced and the rate of the junction temperature rise slows. The trace shown by FIG. 3 indicates a reduction in the heating rate of thermocouple junction between 2900° F. and 2950° F. in the region indicated by the reference character 50.

When a thermocouple junction is heated to the precise temperature of its surroundings, a time versus temperature trace of the thermocouple output signal would theoretically show a flat temperature region in which the indicated temperature level is maintained constant with respect to elapsing time. The environment provided by a heat of steel in a basic oxygen furnace is sufficiently unstable that such quiescent thermocouple output signals do not occur under ordinary circumstances. The steel temperature detecting thermocouple output signal varies rapidly with time and produces a series of spikes or peaks. The spikes or peaks, taken collectively, indicate that the overall time rate of change of thermocouple temperature is reducing and/or proceeding through a "dwell" condition, but a steady state temperature signal dwell is not achieved nor is a precise steel temperature indicated. An effective temperature dwell region on the time-temperature trace of FIG. 3 is indicated by the reference character 52 and as illustrated, this region, while of relatively brief duration, does not have the overall time rate of change of temperature that the region 50 has.

When the lance 24 is withdrawn from the steel, the thermocouple junction passes through the slag layer (which is hotter than the steel) causing a large temperature "spike" 54 to appear on the time-temperature trace. The junction 39 thereafter cools quickly as it is withdrawn from the slag until it is disconnected from the lance 24. When the thermocouple is disconnected, the input circuit to the system 10 is opened which gives the trace the appearance that an infinite temperature has been sensed.

In the past time-temperature traces, such as that illustrated by FIG. 3, have been produced by analog displays (for example, pen recorders). The traces have been interpreted by skilled attendants who determine whether a temperature "dwell" has effectively been indicated and, if so, the level of the dwell temperature (i.e., the steel temperature). Interpreting the time-temperature traces is often difficult, tends to be subjective and, if inaccurate, can cause serious problems later on in the steel production process as noted previously.

The steel oxygen content has also been conventionally displayed by analog recorders which produce traces similar in appearance but inverted to that illustrated by FIG. 3. Currently used oxygen-sensing cells require in the vicinity of 12 seconds to reach an oxygen "dwell" level, and since the indicated oxygen level depends upon the steel temperature, oxygen level determinations have been dependent upon interpretation of both the temperature and oxygen traces. The system 10, which is illustrated by FIG. 1, is constructed and arranged to identify and announce the existence of both a temperature dwell and an oxygen content dwell in the output signals from the lance 24. In addition, the system 10 calculates approximations of the indicated dwell levels to permit rapid calculation of the temperature and the oxygen content corrected for the sensed temperature level. The system 10 is associated with analog display devices 60, 61 which are preferably conventional pen-type recorders and indicate, respectively, time-temperature traces and time-oxygen traces (uncorrected for temperature). The system 10 is also associated with a numerical, or digital, display 62 which indicates quantified approximations of temperature dwell levels produced by the system. The display 62 is connected to the system by an output line 64 which is also connected to the input of a computer or miniprocessor (not shown).

Oxygen dwell levels are computed (uncorrected for temperature) by the system 10 and transmitted to the computer or miniprocessor via an output line 65. The corrected oxygen level is computed using the temperature dwell level furnished on the line 64 and the corrected oxygen content is displayed, preferably in terms of parts per million, on a suitable display (not illustrated).

The system 10 is constructed to announce that a temperature or oxygen content dwell has been detected by dwell-announcing output lines 66, 67, both of which are capable of operating a horn, indicator lights, or other suitable devices.

Figure 4:
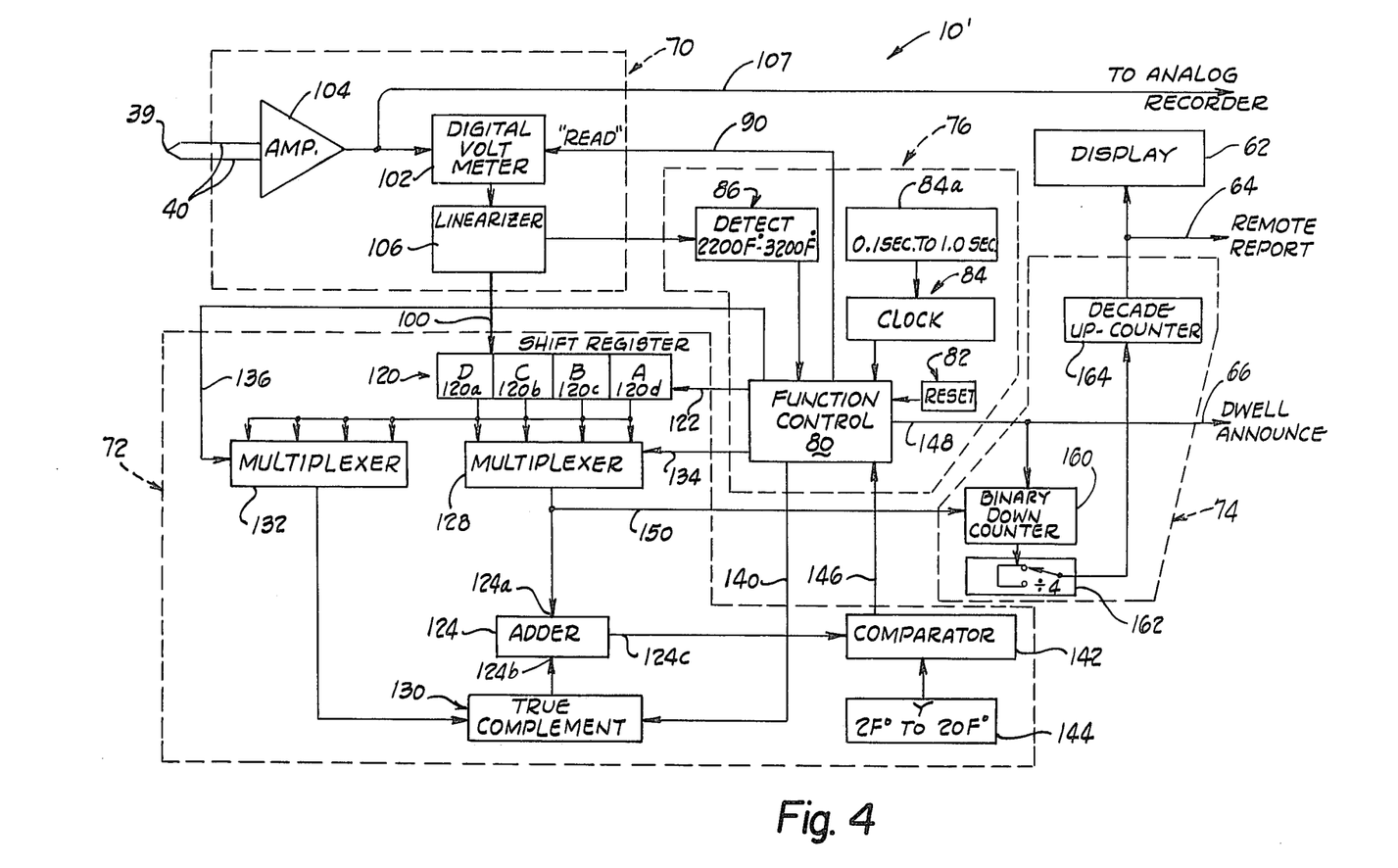
FIG. 4 is a schematic diagram of one embodiment of a condition-determining system constructed according to principles of the present invention; and, FIG. 5 is a schematic representation of another embodiment of a condition-determining system constructed according to the principles of the invention.
Figure 5:
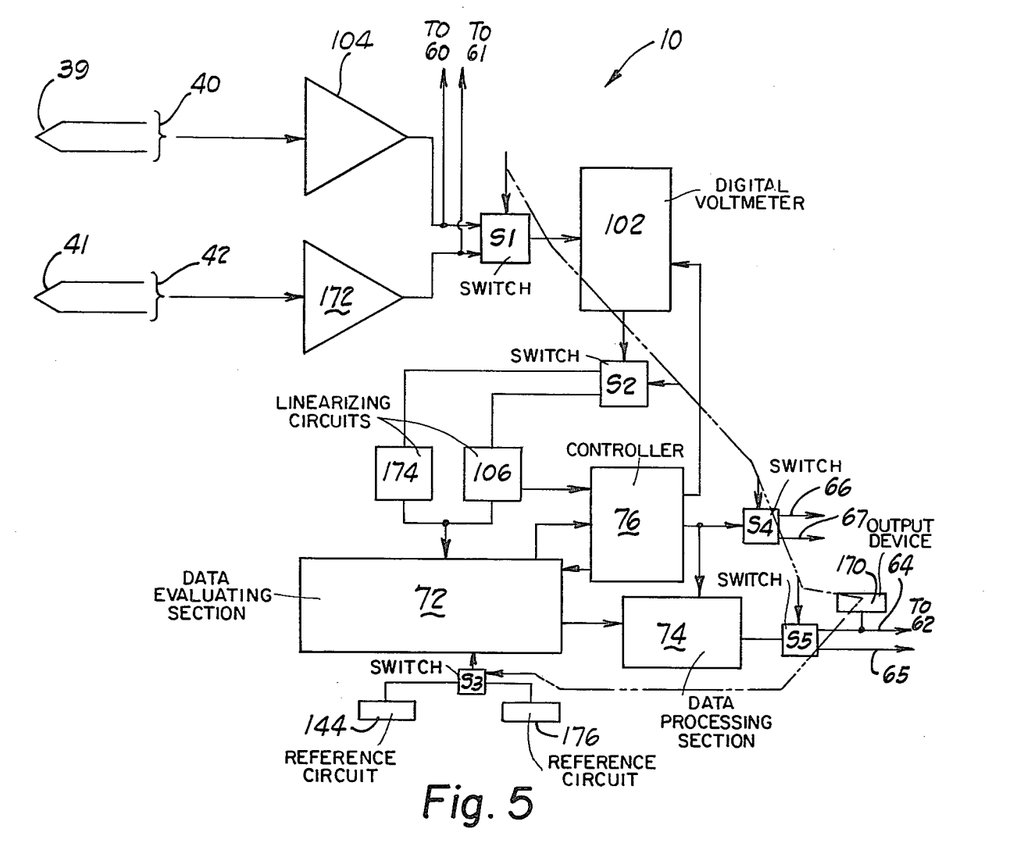

FIGS. 4 and 5 illustrate, schematically, representative condition-determining systems constructed according to the principles of the invention. FIG. 4 is representative of a system 10' which determines temperature of a heat of steel but does not monitor the steel oxygen content. For the purpose of facilitating understanding of the exemplary systems, the temperature-determining system 10' is described first.

Referring to FIG. 4, the system 10' comprises an input data processing section 70, a data evaluating section 72, an output data processing section 74 and a controller section 76 which governs and coordinates operation of the sections 70, 72 and 74. Briefly, the sections of the system 10' cooperate as follows: the input data processing section 70 receives analog-sensed temperature signals from the junction 39 and, on command from the controller 76, processes the signals to enable production of quantified sample values corresponding to instantaneous analog-sensed temperature signals. The data evaluation section 72 receives the sample temperature values from the section 70 and stores them for evaluation. The stored values are evaluated in terms of each other under control of the controller 76, and when a given number of successive stored sample values are within a given range, or band, of values, a temperature "dwell" event is identified to the controller 76 by the section 72. The controller 76 produces a "dwell" announcing output and initiates operation of the output data processing section 74. The section 74 is effective to compute an approximate dwell temperature value based on the stored evaluated sample values. The approximate dwell temperature value is output from the system 10' on the output line 64 (FIG. 4).

The controller 76 includes function control circuitry 80 (schematically illustrated), a manual reset button 82, clock circuitry 84, and a sensed temperature-responsive enabling circuit 86. The function control circuitry 80 is provided with various inputs by which operations of particular sections are monitored and outputs by which command signals are transmitted to sections of the system 10'. The function control circuitry 80 is rendered effective in response to manual actuation of an on-off switch (not shown) which also initiates operation of the clock circuitry 84. The clock circuitry 84 produces a train of high-frequency timing pulses which are fed to the function control circuitry 80 and form the basis for all of the function control circuitry output signals.

Whenever the controller 76 is turned "on," the function control circuitry produces "read" command signals on an output line 90 to the input data processing section 70. The "read" signals have a frequency which is related to the clock circuitry output frequency. In the preferred embodiment, the analog temperature signal from the lance 24 is sampled each time a "read" signal is output from the function control circuitry. The frequency of the "read" signal is adjustable and, in the illustrated embodiment, it is adjusted by adjusting the frequency of the clock circuitry 84. A frequency-adjusting arrangement 84a is provided by which the frequency of the "read" signals can be adjusted from 0.1 seconds to 1.0 seconds.

In the illustrated system, the input data processing section 70 receives input analog data signals from the junction 39 via the leads 40 and produces sample temperature value signals which are transmitted to the data evaluating section 72 via an output line 100. The input data processing section includes an analog signal sampling device in the form of a digital voltmeter 102 having its input connected to the leads 40 via an input amplifier 104, and its output connected to the output line 100 via a linearizing circuit 106. The digital voltmeter 102 receives "read" signals on the line 90 and, in response to each "read" signal, produces a digitized, binary coded, output signal indicative of the instantaneous value of the sensed temperature signal.

Thermocouple junctions are typically nonlinear in their electrical response through a range of detected temperatures and the response characteristics of given junction types are known. Accordingly, the linearizer 106 includes a "Read Only Memory" (not illustrated) which is programmed in accordance with the known temperature response characteristics of the junction 39. The linearizer 106 receives and modifies the digital voltmeter output to produce a linearized temperature sample value on the output line 100.

The analog recorder 60 is preferably connected to the output of the amplifier 104 via a line 107 to enable monitoring of the system 10', if desired.

The function control circuitry outputs (which carry the command signals other than the "read" signals) remain, by and large, inactive so long as the sensing lance 24 remains at ambient atmospheric temperature; however, when the lance is thrust into a heat of steel and the thermocouple output signal indicates sensed temperatures in excess of 2200° F., the temperature-responsive enabling circuit 86 renders the function control circuitry effective. In the illustrated embodiment, the enabling circuit receives an input indicating a sensed temperature of 2200° F. or more from the section 70 and, in turn, produces an enabling output signal for the function control circuitry 80. The data evaluation section 72 and the output data processing section 74 are thereafter rendered effective by appropriate command signals from the function control circuitry.

The illustrated data evaluation section 72 stores successive temperature sample values input to it on the line 100 and compares the stored values to each other and to a reference to determine whether the stored values are within a given range of values. If so, a temperature dwell is identified. The storing and evaluating procedures are performed in response to commands from the circuitry 80. The circuitry 80 monitors the evaluation procedure so that the existence of a temperature dwell is detected.

In the illustrated system, the evaluation section 72 stores successive sample temperature values in a shift register 120. The shift register 120 preferably forms four storage cells 120a–120d which, for the purpose of this description, contain sample temperature signal values indicated by the letters A, B, C, and D. The cells are constructed to receive each of the sample values in binary coded form. The shift register 120 is connected to the function control circuitry 80 via a line 122 by which command signals are delivered to the shift register.

Shift registers like the register 120 are well known and accordingly the construction of the shift register is not disclosed in detail. Suffice it to say that when the binary coded, sample temperature value is to be output from the linearizer 106 to the shift register 120 the signal on the line 122 commands the register to shift all of the recorded sample values rightwardly (as viewed in the drawing) from one cell to the next adjacent cell. The value in the cell 120d is discarded and the cell 120a becomes available for recording the incoming sample temperature value. The command signal on the line 122 also enables the entire sample temperature value to be read into the cell 120a.

The sample temperature values are stored in the shift register 120 on a first-in, first-out basis and, from the condition of the register 120 shown by FIG. 4, if an additional "read" signal were directed to the digital voltmeter on the line 90, the voltmeter 102 and the linearizer 106 would function to put out another sample temperature value referred to here by the letter E. Command signals on the line 122 would cause all the stored values in the cells to shift so that the sample value A is discarded and the cells contain the values B, C, D, E.

The evaluation section 72 is effective to "intercompare" the stored sample values, i.e., compare each stored sample value with each of the other stored sample values. This comparison function is performed by an adder 124 which has two inputs 124a, 124b connected respectively to the shift register 120 and an output 124c on which output signals indicative of the difference between compared sample values appears. The adder input 124a is connected to the shift register 120 through a multiplexer 128 while the adder input 124b is connected to the shift register 120 via a complement coding circuit 130 and a multiplexer 132.

The multiplexers 128, 132 are operated in concert from the function control circuit 80 to enable the stored sample values to be intercompared. The multiplexers 128, 132 are connected to the function control circuitry 80 via command signal lines 134, 136, respectively, and the command signals from the function control circuitry 80 operate the multiplexers so that the value A is compared to each of the values B, C, D; the value B is compared to the respective values C, D; and the value C is compared to the value D.

The comparison operation in the illustrated system 10′ takes place as follows (assuming that the value D has just been read into the shift register 120): the function control circuitry 80 puts out signals on the lines 134, 136 which set the multiplexer 128 to access the value A to the adder input 124a while the multiplexer 132 is operated to serially access each of the values A–D to the adder input 124b via the complement coding circuitry 130. The value A is then compared to the individual values A, B, C and D by the adder 124. When the noted comparison steps have been completed, the multiplexer 128 is indexed by a signal on the line 134 so that the stored sample value B is available to the adder input 124a via the circuit 126 and the multiplexer 132 is again cycled to compare the value of B with the values A–D. Next, the multiplexer 128 is indexed so that the sample value C is available to the adder input 124a and the multiplexer 132 is operated through a complete cycle again so that the complements of the sample values A–D are available to the adder input 124b.

The complement coding circuitry 130 is operated by output signals from the function control circuitry 80 on a line 140, and when a stored sample value is input to the coder, the complement of the input value is output to the adder 124. When the complement of the binary value input to the coding circuit 130 is added to the value input to the adder from the multiplexer 128, the value from the multiplexer 132 is effectively subtracted from the value accessed by the multiplexer 128.

It is apparent that a negative value would result from the comparison of value from the multiplexer 128 with a larger value from the multiplexer 132. In the illustrated system, the binary coded values each include a sign code bit. When the adder 124 arrives at a negative difference between any two values input to it, the sign code of the difference is detected and the negative difference is disregarded by the system.

The output 124c from the adder after any subtraction of a smaller stored sample value from a larger stored sample value is a binary coded signal indicating the difference between the values. Since all the possible combinations of the values are effectively subjected to a subtraction operation and all negative results are disregarded by the system, only the positive differences between intercompared stored values remain for use by the system.

The differences between the intercompared stored sample values are each compared to a reference value to determine whether each stored sample value comes within a predetermined range of each of the other stored sample values. In this way, the existence of a temperature dwell can be identified. The illustrated evaluation section 72 includes a comparator 142 having one of its inputs connected to the adder output 124c and its other input connected to a dwell criteria reference circuit 144 which is adjustable so that the reference level input to the comparator 144 is manually controllable as desired. In the illustrated embodiment, the reference level is manually alterable between values which correspond to 2° F. and 20° F.

The illustrated comparator 142 produces an output to the function control circuitry 80 only when dwell criteria are not met; i.e., only when the adder output value is greater than the value of the reference signal input to the comparator.

Assuming that the dwell criteria are met, the function control circuitry 80 produces a dwell-announcing output signal on line 148 as well as initiating coaction between the evaluation section 72 and the output data processing section 74. The latter is rendered effective to produce an output signal corresponding to a computed dwell temperature level, preferably expressed as a decimal number on a suitable digital display. In the illustrated system 10', the output data processing section 74 computes an arithmetic average of the stored sample values.

At the conclusion of the comparisons of the stored sample value differences with the reference value (assuming the dwell criteria are met) the function control circuitry 80 produces a dwell-indicating output signal on the line 148 which is effective to initiate operation of a dwell annunciator, such as a horn, light, etc. The dwell-indicating output signal also renders the output data processing section 74 effective. In addition, the control circuit 80 produces signals on the line 134 which causes the multiplexer 128 to successively access the stored sample values A–D to the output data processing section 74 on a line 150.

The illustrated output data processing section 74 includes a binary down-counter unit 160, a "divide-by-four" switch unit 162 connected to the binary down-counter output, and a decade up-counter unit 164 between the switch unit 162 and the digital display 62 and digital output line 64.

The down-counter unit 160 can be of any suitable or conventional construction which receives and stores the binary values A, B, C, and D and produces an output count pulse for each integer represented by each of the values. The down-counter output pulses are input to the "divide-by-four" switch unit 162 which produces one output pulse for every four pulses input to it. The decade up-counter 164 counts the output pulses from the switch unit 162 and produces an output signal which is effective to operate the display 62 to exhibit the decimal number which is the average of the values A, B, C, and D. The up-counter output is also transmittable to a computer, a microprocessor, or other device via the line 64.

The numerical output from the output data processing section representing a dwell temperature approximation can be computed in other ways. For example, the shift register 120 can be replaced by a ten-cell register for storing ten sample values and these values, after meeting dwell criteria, can be decimalized and added together after dropping the units digit from each. An approximation corresponding to an appropriately weighted average of the stored sample values can be calculated placng greater weight on most recently obtained sample values. Any other suitable approximation can be calculated based on any number of stored sample values.

In the event dwell criteria are not met, the oldest stored sample value is discarded, a new sample value is stored, and the intercomparing operation is undertaken again. In the illustrated system 10', when the difference between any given pair of compared values is greater than the predetermined reference value, the comparator 142 produces an output to the circuitry 80 on the line 146. The circuitry 80 is provided with suitable logic circuits for resetting the multiplexers 128, 132 to their cycle starting conditions and shifting the register 120 to discard the A value and accept a subsequently sampled value when the next succeeding "read" signal is generated.

When the system 10' has detected a dwell and calculated the dwell temperature level, no further dwell-seeking steps are performed by the system regardless of further manipulation of the lance 24. When the assembly 38 is detached from the lance 24, the input to the amplifier 104 is open-circuited and the open-circuit condition is detected by a suitable device (not illustrated) which conditions the system 10' for returning to its dwell-seeking mode of operation. As soon as a temperature greater than 2200° F. is detected by the replacement assembly 38 the enabling circuitry 86 reinitiates dwell-seeking.

To calibrate the system or to confirm a dwell reading the reset button 82 is actuated. Resetting the system allows it to run freely and continuously display average sensed temperatures (e.g., ambient air temperature). These temperatures are successively output to the display 62 and the system can be calibrated using the display output. Whenever the sensed temperature exceeds 2200° F. the circuitry 86 returns the system 10' to its condition for determining the temperature of a molten heat of steel and then terminating further dwell seeking until reset or re-enabled.

A device similar to the system 10' constructed according to this invention can be obtained from Bay Laboratories Inc. under Model No. 9601.

FIG. 5 illustrates the system 10 of FIG. 1 in greater detail. The system 10 determines both temperature and oxygen dwells and dwell levels and utilizes many components which are essentially identical to those illustrated and described in reference to the system 10' of FIG. 4. Components and sections of FIG. 5, which are identical to components and sections of FIG. 4, are indicated by corresponding reference characters. The system 10 includes a sample value storage and evaluation section 72, an output data processing section 74 and a controller section 76, all of which can be identical in structure and function to the corresponding sections of FIG. 4.

Temperature dwells are established within about 6 seconds after thermocouple junction immersion while oxygen dwell levels are normally attained from 6 to 12 seconds after oxygen cell immersion. Accordingly, common components of the system 10 are employed to successively determine when criteria for both dwells are met and an approximate value for each dwell level. The calculated temperature level is output to the computer or microprocessor and stored until the calculated oxygen level is output after which the computer or processor computes the oxygen level corrected for temperature. The system 10 is automatically switched from its temperature-determining mode to its oxygen content determining mode.

The illustrated system 10 is provided with a switching network formed by coacting switches S1-S5. The switching network, when in an initial condition, enables the system 10 to determine when a temperature dwell has occurred and what the dwell level is (in the manner described above). In a second switching network condition, the switches enable the system 10 to determine when an oxygen dwell is obtained and the approximate oxygen content of the steel, preferably in parts per million, uncorrected for temperature.

When the temperature dwell has been identified and its level approximate, the approximate temperature level is displayed by the display 62 and output to the computer or microprocessor for storage. At the same time, an output device 170 is rendered effective to alter the condition of the switching network by actuating the switches S1-S5 so that the system 10 seeks an oxygen content dwell.

When the condition of the switch S1 is altered, the thermocouple junction 39 and amplifier 104 are disconnected from the voltmeter 102, and the oxygen cell 41 and its amplifier 172 are connected to the voltmeter. Analog sensed oxygen content signals are thus input to the system 10 via the switch S1.

The switch S2 is operated to disconnect the temperature linearizer 174 between the voltmeter 102 and the section 72. The oxygen cell 41, like the thermocouple junction 39, produces a nonlinear output response over the range of oxygen levels it is required to sense. This nonlinearity is compensated for by the linearizer 174.

The switch S3 changes condition to disconnect the temperature reference circuit 144 from the comparator 142 and connect an oxygen reference circuit 176 to the comparator. The oxygen reference circuit 176 is manually settable between predetermined limits to establish desirable oxygen content dwell criteria. The reference level established by the circuit 176 is input to the comparator via the switch S3.

The condition of the switch S4 is altered to disconnect the temperature dwell annunciator from the output line 148 and connect the oxygen dwell annunciator to the line 148. The switch S4 may be omitted from the system if a single annunciator is used to indicate both temperature and oxygen dwells.

The switch S5 has its condition changed to connect the oxygen level approximation output signal to the computer or microprocessor. The oxygen level approximation is corrected for temperature utilizing the previously stored temperature approximation and the correct approximate oxygen content level, in terms of parts per million, is transmitted from the computer or processor to a numerical display device (not illustrated).

The output device 170 is reset to enable the switches S1-S5 to be reset or returned to their initial temperature monitoring conditions when the sensor assembly 38 is disconnected from the lance 24.

While two embodiments of the invention have been illustrated and described in detail, the invention should not be considered limited to the precise construction shown. Various adaptations, modifications, and uses of the invention may occur to those skilled in the art to which the invention relates and the intention is to cover all such adaptations, modifications and uses which fall within the scope or spirit of the appended claims.

What is claimed is:

1. A method of approximately quantifying a sensed physical condition comprising:
    (a) enabling a sensor to sense the condition;
    (b) producing a sensor output signal indicative of the condition as sensed by the sensor;
    (c) processing the sensor output signal to produce sample value representations;
    (d) storing at least a predetermined number of said sample value representations;
    (e) detecting dwelling of the condition as sensed by comparing at least one of the stored sample value representations with each of the remaining stored sample value representations and determining that said sample value representations fall within a predetermined range; and,
    (f) producing an output approximating the condition dwell value.

2. The method claimed in claim 1 wherein producing an output comprises computing the output valve using said plurality of sample value representations.

3. The method claimed in claim 2 wherein computing said output value includes averaging said plurality of sample value representations.

4. The method claimed in claim 1 wherein storing sample value representations includes storing said representations on a first-in, first-out basis and discarding the oldest stored sample value representation in response to a failure to detect dwelling of the condition.

5. The method claimed in claim 1 wherein processing said sensor output signal includes modifying the signal to effectively linearize the response of said sensor over a range of sensed condition values.

6. The method claimed in claim 1 wherein processing said sensor output signal includes digitizing an instantaneous output signal value and storing sample value representations includes entering said sensor output signal in a storage means.

7. A method of determining dwelling of a sensed physical condition comprising:
    (a) enabling a sensor to sense the condition;
    (b) producing a sensor output signal indicative of the condition as sensed by the sensor;
    (c) processing the sensor output signal to produce sample value representations each comprising at least one sample condition value;
    (d) storing at least a predetermined number of said sample value representations;
    (e) detecting dwelling of the condition as sensed by comparing at least one of the stored sample value representations with each of the remaining stored representations sample value representations fall within a predetermined range; and,
    (f) producing a signal when dwelling of the condition is detected.

8. A method of detecting a temperature dwell in a molten material comprising the steps of:
    (a) placing a temperature sensor in heat-transfer relationship with a molten material;
    (b) producing an analog sensor output signal which varies as a function of sensed temperature;
    (c) processing the sensor output signal to produce a succession of sample temperature value representations;
    (d) storing sample temperature value representations;
    (e) detecting a dwelling of the sensed temperature by:
        (i) comparing each of a plurality of stored sample temperature value representations with each of the remaining stored sample temperature value representations of said plurality; and,
        (ii) determining that the compared sample temperature values are within a predetermined range.

9. The method claimed in claim 8 further including computing an approximate dwell temperature level using said plurality of stored sample temperature value representations.

10. The method claimed in claim 8 wherein comparing the stored sample temperature value representations includes finding the difference between compared representations and determining that the compared representations are within a predetermined range comprises comparing the difference to a predetermined reference value.

11. A method of determining the approximate temperature of a molten material comprising the steps of:
    (a) placing a temperature sensor in heat-transfer relationship with a molten material;
    (b) producing an analog sensor output signal which varies as a function of sensed temperature;
    (c) sampling the sensor output signal to produce a succession of sample temperature value representations;

(d) storing sample temperature value representations;
(e) detecting a dwelling of the sensed temperature by:
(i) comparing each of a plurality of stored sample temperature value representations with each of the remaining stored sample temperature value representations of the plurality; and,
(ii) determining that the compared sample temperature value representations are within a predetermined range; and,
(f) thereafter producing an output representation of the detected dwell temperature.

12. The method claimed in claim 11 wherein producing an approximation of the dwell temperature value comprises computing an arithmetic average of said plurality of sample temperature values.

13. The method claimed in claim 11 wherein comparing the stored sample temperature value representations includes finding the difference between compared representations and determining that the compared representations are within a predetermined range comprises comparing the difference to a predetermined reference value.

14. A system for approximately determining a sensed condition of a molten material comprising:
(a) input data processing means having an input for receiving a condition responsive signal and sampling means for producing sample condition values from instantaneous condition-responsive signal values;
(b) evaluating means for determining the existence of a sensed condition dwell comprising:
(i) processing means for producing sample value representations consisting of at least one sample condition value;
(ii) storage means for storing sample condition value representations output from said data processing means;
(iii) means for establishing that a predetermined plurality of said sample condition value representations fall within a predetermined range;
(c) output processing means for producing a condition representation having a value approximating the sensed condition dwell value.

15. The system claimed in claim 14 further including a sensor means connected to said input data processing means, said sensor means comprising a thermocouple junction and associated leads.

16. The system claimed in claim 15 wherein said sensor means further includes an oxygen-content detecting cell and associated leads, said input data processing means including switch means for alternately rendering said oxygen-content detecting cell and said thermocouple junction effective to provide input condition signals.

17. The system claimed in claim 14 wherein said means for establishing that a predetermined plurality of said sample condition value representations fall within a predetermined range includes first means for determining the value of the difference between each sample value representation of said plurality of representations and second means for comparing the difference value with a predetermined reference value.

18. A method of approximating the value of a sensed condition of a molten material comprising the steps of:
(a) immersing a sensor in molten material;
(b) monitoring the condition of the sensor;
(c) producing a succession of monitored sample value representations;
(d) individually storing sample value representations;
(e) detecting dwelling of the monitored condition by:
(i) comparing at least one sample value representation with each remaining sample value representation of a series of stored sample value representations;
(ii) determining that the compared sample value representations are within a predetermined range of values; and,
(f) processing the values of said series of said representations to produce an output approximation of the dwell condition value.

19. A system for approximately determining sensed conditions of a fluent medium comprising:
(a) first and second condition sensor means for producing first and second condition responsive signals;
(b) input data processing means having an input for receiving one of said condition responsive signals and sampling means for producing sample condition values from instantaneous values of said one condition responsive signal;
(c) evaluating means for determining the existence of a sensed dwelling of said one condition comprising:
(i) data processing means for producing sample value representations consisting of at least one sample condition value;
(ii) storage means for individually storing sample value representations output from said data processing means;
(iii) means for establishing that a given plurality of said sample value representations have a predetermined relationship;
(d) output processing means for producing a condition representation having a value approximating the sensed dwell level of said one condition; and,
(e) switching network means responsive to said output processing means for enabling said system to determine the approximate value of another condition comprising first switch means for connecting said other of said condition responsive signals to said input data processing means, and second switch means for conditioning said comparator means to determine relationships between a predetermined plurality of sample values of said another condition.

20. The system claimed in claim 19 wherein one of said sensor means comprises a thermocouple junction and associated leads.

21. The system claimed in claim 20 wherein the other sensor means comprises an oxygen content detecting cell and associated leads.

* * * * *